(12) United States Patent  
Ayyanar et al.

(10) Patent No.: US 8,243,410 B2
(45) Date of Patent: Aug. 14, 2012

(54) TRANSIENT VOLTAGE COMPENSATION SYSTEM AND METHOD

(75) Inventors: Rajapandian Ayyanar, Gilbert, AZ (US); William J. Lambert, Tempe, AZ (US); Shamala A. Chickamenahalli, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 12/116,746

(22) Filed: May 7, 2008

(65) Prior Publication Data

US 2009/0279224 A1    Nov. 12, 2009

(51) Int. Cl.
*H02H 3/22* (2006.01)
*H02H 3/20* (2006.01)
*H02H 9/04* (2006.01)

(52) U.S. Cl. ........................... 361/111; 361/91.1

(58) Field of Classification Search ............... 361/118
See application file for complete search history.

(56) References Cited

U.S. PATENT DOCUMENTS

| 5,629,608 | A * | 5/1997 | Budelman ............ 323/268 |
| 6,819,537 | B2 * | 11/2004 | Pohlman et al. ............ 361/64 |
| 6,947,273 | B2 * | 9/2005 | Bassett et al. ............ 361/111 |
| 7,253,594 | B2 * | 8/2007 | Paul et al. ............ 323/268 |
| 7,486,057 | B2 * | 2/2009 | Kosht et al. ............ 323/272 |

\* cited by examiner

*Primary Examiner* — Dharti Patel
(74) *Attorney, Agent, or Firm* — Winkle, PLLC

(57) ABSTRACT

A transient voltage compensation system is provided. The transient voltage compensation system includes a processor and a first voltage regulator coupled to the processor, wherein the first voltage regulator is to deliver a load current to the processor at an output voltage. The transient voltage compensation system also includes a second voltage regulator coupled to the first voltage regulator, wherein the second voltage regulator is to regulate the output voltage in response to transient loads of the processor.

19 Claims, 5 Drawing Sheets

TRANSIENT VOLTAGE COMPENSATION SYSTEM AND METHOD

BACKGROUND

Voltage regulators for powering a microelectronic device such as a microprocessor are required to provide a steady state voltage as well as respond to transient current demands of such devices. When the load current of the processor increases, such as during a state of change of the processor from idle to active, the voltage supplied to the processor decreases. Similarly, an increase in the voltage may occur when the load current of the processor decreases, such as when the processor state changes from active to idle.

The voltage regulator is required to minimize the effects of the transient current demands by reacting as quickly as possible to the change in the load condition. Current voltage regulators achieve the transient response requirements by operating at high switching frequencies with large output capacitance. However, this method also results in higher switching losses and a lower efficiency of the regulator, in addition to the size and cost penalty of large output capacitors.

BRIEF DESCRIPTION OF THE DRAWINGS

Features of embodiments of the claimed subject matter will become apparent as the following detailed description proceeds, and upon reference to the drawings, in which like numerals depict like parts, and in which:

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

As discussed in detail below, the embodiments of the present invention function to provide a transient voltage compensation system and method for a direct current load such as a processor, like a central processing unit (CPU) or a system-on-chip, which is housed in a semiconductor assembly. In particular, the present technique provides a method of regulating an output voltage of a voltage regulator in response to transient loads of the DC load.

References in the specification to "one embodiment", "an embodiment", "an exemplary embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Figure 1:
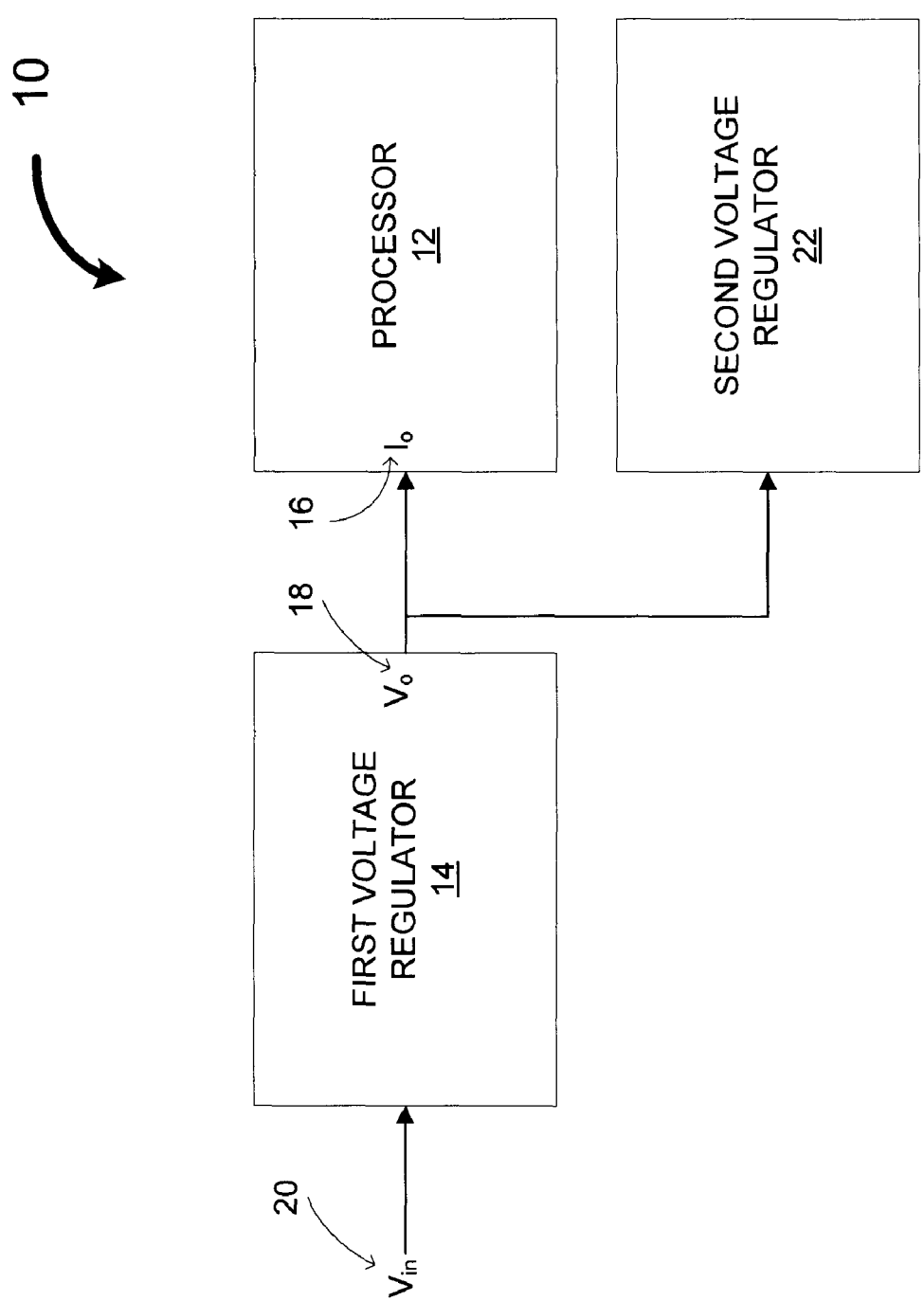
FIG. 1 illustrates an embodiment of a transient voltage compensation system.

Referring first to FIG. 1, a transient voltage compensation system 10 is illustrated. The transient voltage compensation system 10 includes a processor 12 and a first voltage regulator 14 coupled to the processor 12. The first voltage regulator 14 is to deliver a load current ($I_o$) 16 to the processor 12 at an output voltage ($V_o$) 18. In the illustrated embodiment, the first voltage regulator 14 includes a DC-DC voltage regulator. In one embodiment, the first voltage regulator 14 includes a boost converter having the output voltage 18 that is greater than an input voltage ($V_{in}$) 20. In an alternate embodiment, the first voltage regulator 14 includes a buck converter having the output voltage 18 that is less than the input voltage 20.

As will be appreciated by one skilled in the art the type of the first voltage regulator 14 may be selected based upon magnitude of the input voltage 20 from a source and a desired output voltage 18 to the processor 12. Other examples of types of voltage regulators include a buck-boost converter, a Cuk converter, a single ended primary inductor converter (SEPIC) and a coupled buck converter. In certain embodiments, the first voltage regulator 14 includes a multi-phase voltage regulator.

The transient voltage compensation system 10 also includes a second voltage regulator 22 coupled to the first voltage regulator 14. In this embodiment, the second voltage regulator 22 is connected to output of the first voltage regulator 14. The second voltage regulator 22 is to regulate the output voltage 18 of the first voltage regulator 14 in response to transient loads of the processor 12. In one exemplary embodiment, the transient loads of the processor 12 occur due to a change of state of the processor 12. For example, the load current 16 may increase when the processor state changes from an idle state to an active state.

In the illustrated embodiment, the second voltage regulator 22 is operated intermittently in response to an occurrence of the transient loads to maintain the output voltage 18 at a desired level. In one embodiment, the second voltage regulator 22 is operated at a low voltage thereby reducing switching and conduction losses and minimize switch ratings for the switches employed in the second voltage regulator 22.

Again, the type of the second voltage regulator 22 may be selected based on the desired operational requirements of the second voltage regulator 22. Examples of the second voltage regulator 22 include a buck converter, a boost converter, a buck-boost converter, a Cuk converter, a single ended primary inductor converter (SEPIC), and a coupled buck converter. Further, the second voltage regulator 22 may include a multi-phase voltage regulator. In one embodiment, the second voltage regulator 22 includes an unloaded DC-DC voltage regulator. In another embodiment, the second voltage regulator 22 includes a lightly loaded DC-DC voltage regulator. In one exemplary embodiment, the lightly loaded DC-DC voltage regulator includes a load of about less than 1 Amperes.

In certain embodiments, the second voltage regulator 22 is operated in a continuous mode to reduce an interleaved output current ripple of the first voltage regulator 14. In particular, a duty cycle of the second voltage regulator 22 is based on a number of phases and a switching frequency of the first voltage regulator 14. The details of this mode will be described below with reference to FIG. 5.

Figure 2:
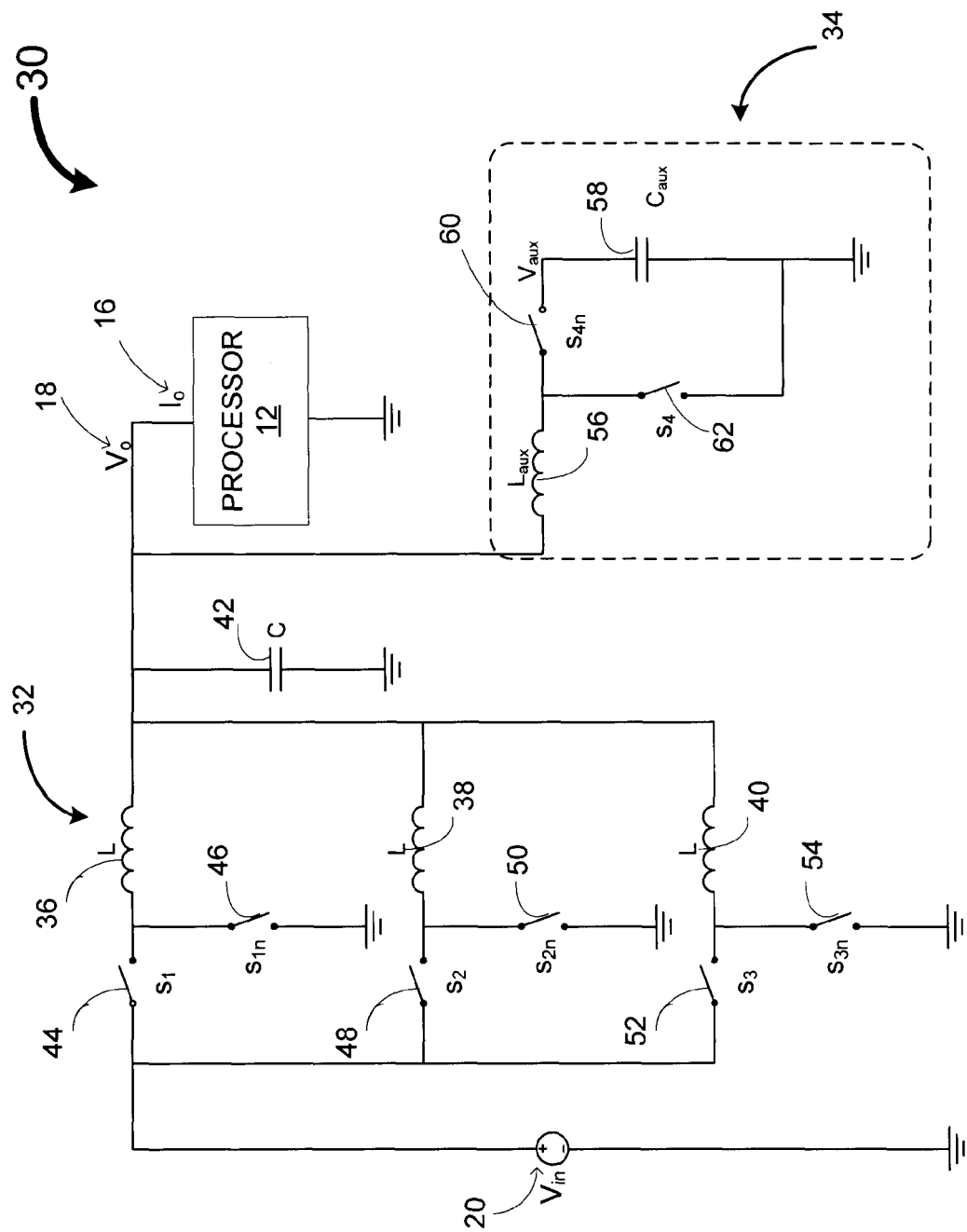
FIG. 2 illustrates an exemplary implementation of the transient voltage compensation system of FIG. 1.

FIG. 2 illustrates an exemplary implementation 30 of the transient voltage compensation system 10 of FIG. 1. As illustrated, the transient voltage compensation system 30 includes a first voltage regulator 32 and a second voltage regulator 34. In this exemplary embodiment, the first voltage regulator 32 includes a three-phase buck converter and the second voltage regulator 34 includes a bi-directional boost converter. The first voltage regulator 32 includes inductors 36, 38 and 40 and a capacitor 42. Further, switches such as represented by reference numerals 44, 46, 48, 50, 52 and 54 are employed to control the flow of current through the inductors 36, 38 and 40 and the capacitor 42. In one exemplary embodiment, the inductance of each of the inductors 36, 38 and 40 is about 300 nanohenry (nH).

The first voltage regulator 32 is to deliver the load current ($I_o$) 16 to the processor 12 at the output voltage ($V_o$) 18. In this exemplary embodiment, the output voltage 18 is less than the input voltage ($V_{in}$) 20. During a steady state condition, the first voltage regulator 32 delivers the load current 16 to the processor 12 at a desired output voltage 18. Further, the second voltage regulator 34 is operated intermittently in response to an occurrence of the transient loads of the processor 12.

In this exemplary embodiment, the second voltage regulator 34 includes an inductor 56 and a capacitor 58. In certain embodiments, an inductance of the inductor 56 is less than an inductance of each of the inductors 36, 38 and 40 of the first voltage regulator 32. It should be noted that the selected output voltage of the second voltage regulator 34 is relatively low as compared to the input voltage 20. As a result, the instantaneous voltage across the inductor 56 is lower as compared to voltage across the inductors 36, 38 and 40 of the first voltage regulator 32. Therefore, the inductance of the inductor 56 is less than the inductance of each of the inductors 36, 38 and 40 of the first voltage regulator 32. In one exemplary embodiment, the inductance of the inductor 56 is about 5% of the inductance of each of the inductors 36, 38 and 40 of the first voltage regulator. In the illustrated embodiment, the inductance of the inductor 56 is between about 10 nH to about 20 nH. Further, the second voltage regulator 34 includes switches such as represented by reference numerals 60 and 62 to control the flow of current through the inductor 56 and the capacitor 58. As described above, the inductance of the inductor 56 is less than that of inductors 36, 38, 40. Since the output voltage 18 is low, the switches 60 and 62 switch quickly at high efficiency allowing load transients to be quickly regulated.

In operation, the second voltage regulator 34 charges the capacitor 58 to a desired voltage level. In one exemplary embodiment, the capacitor 58 is maintained at a voltage that is greater than the output voltage 18. In another exemplary embodiment, the capacitor 58 is maintained at a voltage (Vaux) that is proportional to the load current 16 of the processor 12. In one embodiment, the voltage Vaux of the second voltage regulator 34 is charged to a value based on the topology of the second voltage regulator 34. In the illustrated embodiment, the voltage Vaux is greater than output voltage (Vo) 18 to enable proper functioning of the second voltage regulator 34. It should be noted that maintaining the capacitor 58 at a voltage (Vaux) proportional to the load current is beneficial for minimizing the losses associated with the second voltage regulator 34. During the steady state condition, the processor 12 draws a constant load current 16 and the switches 60 and 62 are held in a position such that no current is drawn by the second voltage regulator 34 and the capacitance of the capacitor 58 is maintained at a constant level.

Further, when a transient load is detected, the second voltage regulator 34 is operated to regulate the output voltage 18 at the desired level. In one exemplary embodiment, the second voltage regulator 34 draws excess current from the first voltage regulator 32 and stores excess charge in the capacitor 58 in response to a decrease in the load current 16 of the processor 12. The second voltage regulator 34 transfers charge from the capacitor 58 to the capacitor 42 of the first voltage regulator 32 in response to an increase in the load current 16 of the processor 12.

Thus, based upon an increase or a decrease in the load current 16 of the processor 12, the second voltage regulator 34 sources or sinks the current to maintain the output voltage 18 at the desired level. Several control methods are possible for second voltage regulator 34 including voltage mode control, current mode control and hysteretic control. In one exemplary embodiment, the first voltage regulator 32 and the second voltage regulator 34 are controlled independently. In another exemplary embodiment, the first voltage regulator 32 and the second voltage regulator 36 are controlled through a multiple input multiple output (MIMO) control. In certain embodiments, the second voltage regulator 34 is operated at a voltage level to optimize the transient response of the transient voltage compensation system 30.

Figure 3:
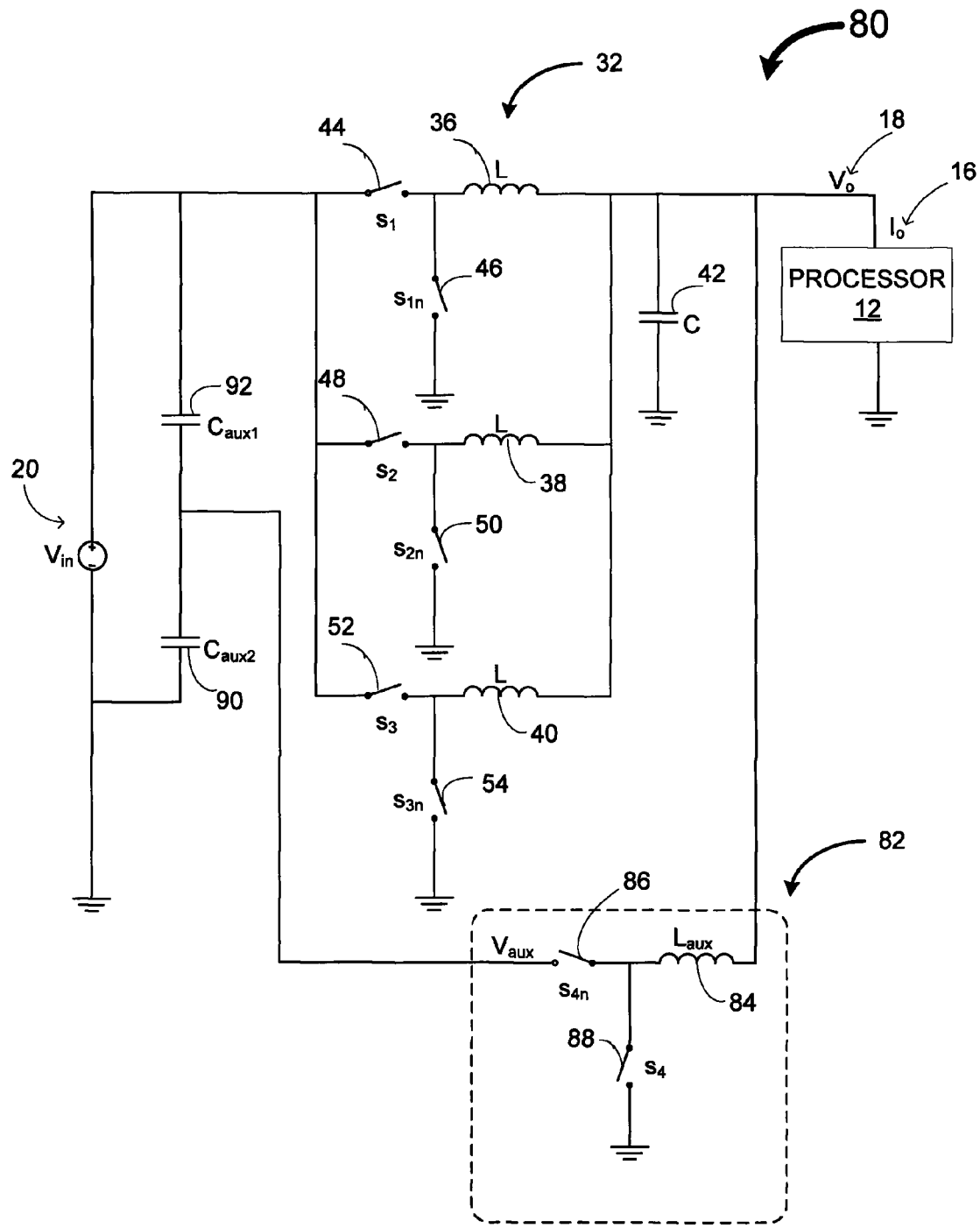
FIG. 3 illustrates another exemplary implementation of the transient voltage compensation system of FIG. 1.

FIG. 3 illustrates another exemplary implementation 80 of the transient voltage compensation system 10 of FIG. 1. The transient voltage compensation system 80 includes the first voltage regulator 32 as described above with reference to FIG. 2. In addition, the transient voltage compensation system 80 includes a second voltage regulator 82 coupled to the first voltage regulator 32. The second voltage regulator 82 includes an inductor 84. Further, switches 86 and 88 are employed to control flow of current through the second voltage regulator 82. In this exemplary embodiment, the transient voltage compensation system 80 also includes a first capacitor 90 and a second capacitor 92. The illustrated implementation uses the first capacitor 90 to filter the input voltage 20 thereby resulting in cost savings. Further, the size of the first and second capacitors 90 and 92 is based upon the topology of the second voltage regulator 82.

In operation, when there is a decrease in the load current 16 of the processor, the second voltage regulator 82 draws the excess current from the first voltage regulator 32. Further, the excess charge is stored in the first and second capacitors 90 and 92. Further, when there is an increase in the load current 16 of the processor 12, the second voltage regulator 82 transfers charge from the first and second capacitors 90 and 92 to the capacitor 42 of the first voltage regulator 32 to maintain the output voltage 18 at a desired level. In certain embodiments, a capacitance of each of the first capacitor 90 and the second capacitor 92 is selected to achieve an optimal transient response of the second voltage regulator 82. In the illustrated embodiment the capacitance of the first capacitor 90 is relatively larger than the capacitance of the second capacitor 92 such that voltage (Vaux) of the second regulator is lesser as compared to input voltage (Vin) 20. Low value of the voltage (Vaux) enhances the dynamic performance of the second voltage regulator 82 and also reduces the losses in the second voltage regulator 82. In one embodiment, the capacitance of the first capacitor 90 is about five times the capacitance of the second capacitor 92.

Figure 4:
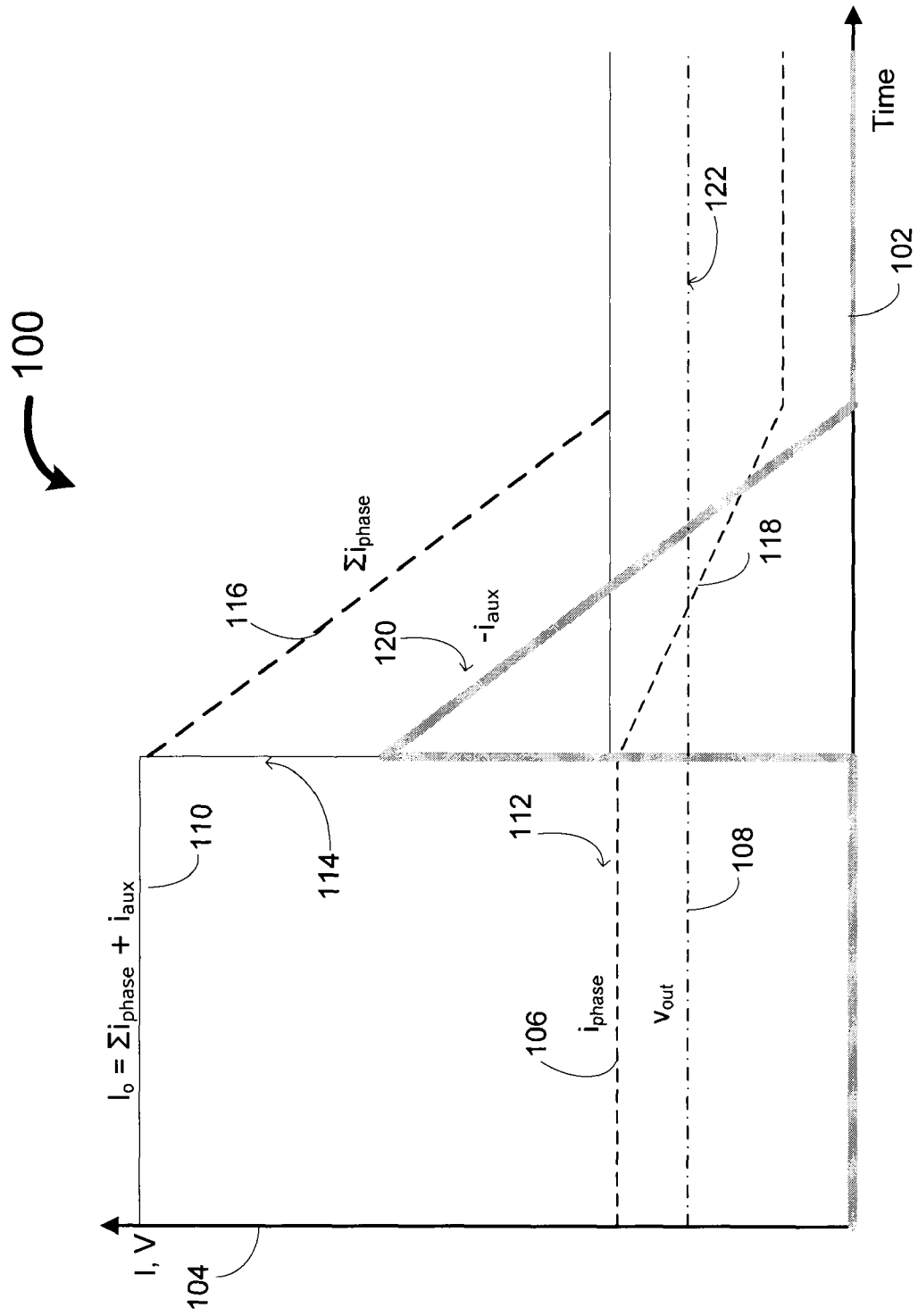
FIG. 4 is a graphical representation of average current waveforms during operation with the second voltage regulator in the transient voltage compensation system 10 of FIG. 1.

FIG. 4 is a graphical representation of average current waveforms 100 during operation with the second voltage regulator 22 in the transient voltage compensation system 10 of FIG. 1. In the illustrated embodiment, the abscissa axis represents time 102 and the ordinate axis 104 represents load current/output voltage of the processor 12 (see FIG. 1). Further, the current drawn by each phase of the first voltage regulator 14 (see FIG. 1) is represented by reference numeral 106 and the output voltage at the capacitor of the first voltage regulator 14 is represented by reference numeral 108.

As illustrated, the initial current drawn by the processor 12 is represented by reference numeral 110. In this embodiment, the current 110 is a sum of the current drawn by the first voltage regulator 14 and the current drawn by the second voltage regulator 22. During a steady state condition, the current drawn 106 by each phase of the first voltage regulator is a constant value as represented by reference numeral 112. Further, the output voltage 108 is maintained at a desired level.

In this exemplary embodiment, during a transient load, there is a decrease in the load current of the processor 12, as represented by reference numeral 114. As a result, the current 116 drawn by the phases of the first voltage regulator 14 decreases and the current drawn by each phase of the first voltage regulator 14 decreases, as represented by reference numeral 116. The second voltage regulator 22 draws the excess current from the first voltage regulator 14, as represented by reference numeral 120. Further, the excess charge is stored in the capacitor 42 (see FIG. 2) of the first voltage regulator 14. As a result, the output voltage 108 does not increase in response to the decrease in the load current and is maintained at a constant level.

Thus, the second voltage regulator 22 compensates for the transient load while maintaining the output voltage at a desired level while reducing the capacitance of the capacitor 42 of the first voltage regulator 14. This enables use of lower switching frequency and/or different topologies or components in the first voltage regulator 14 thereby resulting in better efficiency and cost saving as compared to a system without the second voltage regulator 22.

Figure 5:
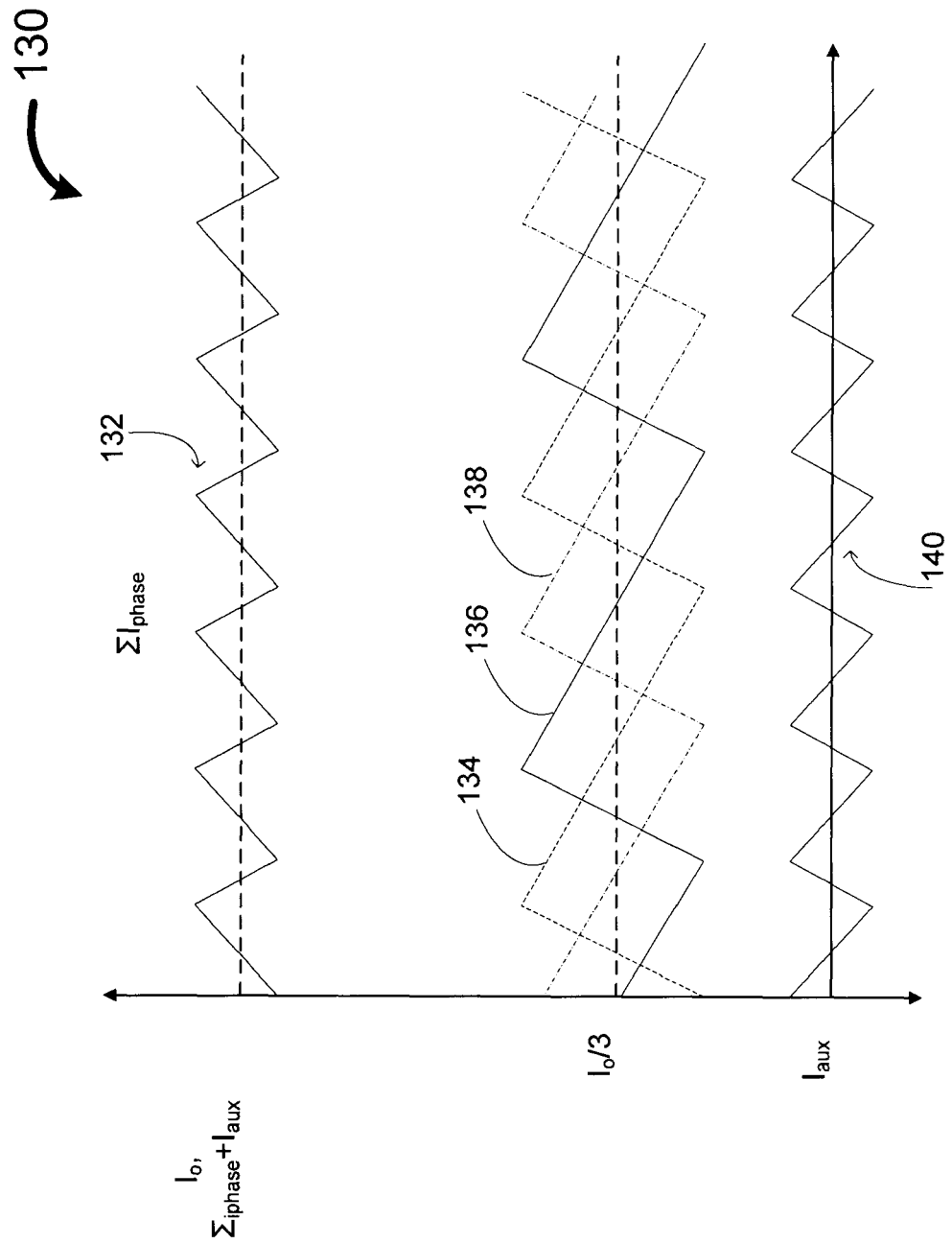
FIG. 5 illustrates exemplary current waveforms of the transient voltage compensation system of FIG. 2 in an interleaved output current ripple reduction mode.

FIG. 5 illustrates exemplary current waveforms 130 of the transient voltage compensation system 30 of FIG. 2 in an interleaved output current ripple reduction mode. As described before, the second voltage regulator 34 (see FIG. 2) may be operated in a continuous mode to reduce an interleaved output current ripple of the first voltage regulator 32 (see FIG. 2). In certain embodiments, a duty cycle of the second voltage regulator 34 is based on a number of phases and a switching frequency of the first voltage regulator 32. In one embodiment, the second voltage regulator 34 is operated at a frequency that is greater than the frequency of the first voltage regulator 32.

In the illustrated embodiment, the sum of current drawn by each phase of the first voltage regulator 32 is represented by reference numeral 132. Further, the interleaved current ripple for each of the three phases of the first voltage regulator are represented by waveforms 134, 136 and 138. In this exemplary embodiment, the inductance of the inductor 56 (see FIG. 2) of the second voltage regulator 32 is selected such that the second voltage regulator 32 draws an amount of current that balances the output current ripple of the first voltage regulator. The current drawn by the second voltage regulator 34 is represented by waveform 140. As a result, the interleaved output current ripple from the phases (represented by reference numerals 134, 136 and 138) is summed with the current 140 from the second voltage regulator 34 thereby minimizing the output current ripple of the first voltage regulator 32.

The various aspects of the embodiments described above may have utility in applications with DC loads where transient voltage compensation is desired. In particular, the current technique employs an additional voltage regulator coupled to a primary voltage regulator for responding to transient loads of the primary voltage regulator to maintain a desired voltage levels. Thus, the primary voltage regulator can be operated at low switching frequencies and with less output capacitance while maintaining the necessary transient response to run a DC load such as a processor.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

The invention claimed is:

1. A transient voltage compensation system, comprising:
a processor;
a first voltage regulator coupled to the processor, wherein the first voltage regulator is to deliver a direct current (DC) load current to the processor at an output voltage;
a second voltage regulator coupled to the first voltage regulator, wherein the second voltage regulator is to regulate the output voltage in response to transient loads of the processor and wherein a duty cycle of the second voltage regulator is based on a number of phases of the first voltage regulator and a switching frequency of the first voltage regulator.

2. The transient voltage compensation system of claim 1, wherein the second voltage regulator is operated intermittently in response to an occurrence of the transient loads to maintain the output voltage at a desired level.

3. The transient voltage compensation system of claim 1, wherein: the first voltage regulator comprises a first capacitor and a first inductor; and the second voltage regulator comprises a second capacitor and a second inductor.

4. The transient voltage compensation system of claim 3, wherein the second voltage regulator is to draw excess current from the first voltage regulator and store excess charge in the second capacitor in response to a decrease in the load current.

5. The transient voltage compensation system of claim 4, wherein the second voltage regulator is to transfer charge from the second capacitor to the first capacitor in response to an increase in the load current.

6. The transient voltage compensation system of claim 3, wherein an inductance of the second inductor is smaller than compared to an inductance of the first inductor.

7. The transient voltage compensation system of claim 6, wherein the inductance of the second inductor is between a range of about 5 nanohenry to about 50 nanohenry.

8. The transient voltage compensation system of claim 1, wherein the second voltage regulator is operated in a continuous mode to reduce an interleaved output current ripple of the first voltage regulator.

9. The transient voltage compensation system of claim 1, wherein the first and second voltage regulators are controlled through a voltage mode control, or a current mode control, or a hysteretic control, or a multiple input multiple output control.

10. The transient voltage compensation system of claim 1, wherein the second capacitor is maintained at a voltage greater than the output voltage.

11. The transient voltage compensation system of claim 1, wherein the second capacitor is maintained at a voltage proportional to the load current of the processor.

12. A method of transient voltage compensation of a processor, comprising:
providing a load current at an output voltage to the processor with a first voltage regulator wherein the first voltage regulator is to deliver a direct current (DC) load current to the processor at the output voltage; and regulating the output voltage at a desired level with a second voltage regulator in response to transient loads of the processor, wherein a duty cycle of the second voltage regulator is based on a number of phases of the first voltage regulator and a switching frequency of the first voltage regulator.

13. The method of claim 12, further comprising:

drawing excess current from the first voltage regulator in response to a decrease in the load current of the processor; and storing excess charge in a second capacitor of the second voltage regulator.

14. The method of claim 13, further comprising transferring charge from the second capacitor to a first capacitor of the first regulator in response to an increase in the load current of the processor.

15. The method of claim 12, further comprising reducing an interleaved output current ripple of the first voltage regulator by operating the second voltage regulator in a continuous mode.

16. The method of claim 15, wherein a duty cycle of the second voltage regulator is selected such that a change in an input current of the second voltage regulator balances the interleaved output current ripple of first regulator.

17. A system, comprising:

a processor;

a first voltage regulator coupled to the processor, wherein the first voltage regulator is to deliver a direct current (DC) load current to the processor at an output voltage;

a second voltage regulator coupled to the first voltage regulator, wherein the second voltage regulator is to reduce an interleaved output current ripple of the first voltage regulator, wherein a duty cycle of the second voltage regulator is based on a number of phases of the first voltage regulator and a switching frequency of the first voltage regulator.

18. The system of claim 17, wherein a duty cycle of the second voltage regulator is such that a change in an input current of the second voltage regulator balances the interleaved output current ripple of the first voltage regulator.

19. The system of claim 18, wherein the duty cycle of the second voltage regulator is based on a number of phases of the first voltage regulator and a switching frequency of the first voltage regulator.

* * * * *